United States Patent
Shenoy et al.

(10) Patent No.: US 7,088,979 B1
(45) Date of Patent: Aug. 8, 2006

(54) TRIPLE CONVERSION RF TUNER WITH SYNCHRONOUS LOCAL OSCILLATORS

(75) Inventors: Ravindra U. Shenoy, Sunnyvale, CA (US); Samuel W. Sheng, San Jose, CA (US); Lapoe E. Lynn, Cupertino, CA (US)

(73) Assignee: LSI Logic Corporation, Milpitas, CA (US)

( * ) Notice: Subject to any disclaimer, the term of this patent is extended or adjusted under 35 U.S.C. 154(b) by 790 days.

(21) Appl. No.: 09/880,291

(22) Filed: Jun. 13, 2001

(51) Int. Cl.
*H04B 1/26* (2006.01)

(52) U.S. Cl. .................. 455/313; 455/189.1; 455/323; 455/333

(58) Field of Classification Search ............... 455/313, 455/84, 255, 189.1, 323, 333
See application file for complete search history.

(56) References Cited

U.S. PATENT DOCUMENTS

| | | | |
|---|---|---|---|
| 3,736,510 A * | 5/1973 | Wu ......................... | 455/226.2 |
| 3,939,429 A | 2/1976 | Lohn et al. | |
| 4,334,323 A | 6/1982 | Moore | |
| 4,340,975 A | 7/1982 | Onishi et al. | |
| 4,352,209 A | 9/1982 | Ma | |
| 4,618,863 A * | 10/1986 | Collins ...................... | 342/194 |
| 5,230,097 A * | 7/1993 | Currie et al. ............. | 455/226.1 |
| 5,548,839 A | 8/1996 | Caldwell et al. | |
| 5,737,035 A | 4/1998 | Rotzoll | |
| 5,937,338 A * | 8/1999 | Tomita ..................... | 455/161.2 |
| 6,118,811 A * | 9/2000 | Narumi et al. ............. | 375/219 |
| 6,321,075 B1 * | 11/2001 | Butterfield ................. | 455/313 |
| 6,545,728 B1 * | 4/2003 | Patel et al. ................ | 348/725 |

OTHER PUBLICATIONS

U.S. Appl. No. 09/880,290—"A Receiver Architecture With Improved Filtering Technique"—Author(s)—Lapoe et al.

* cited by examiner

*Primary Examiner*—Bing Q. Bui
(74) *Attorney, Agent, or Firm*—Christopher P. Maiorana, P.C.

(57) ABSTRACT

An apparatus comprising a first circuit, a second circuit and a third circuit. The first circuit may be configured to generate an upconverted signal in response to an input signal and a first oscillation signal. The second circuit may be configured to generate a downconverted signal in response to the upconverted signal and as second oscillation signal. The third circuit may be configured to generate an output signal in response to the downconverted signal and a third oscillation signal derived from the second oscillation signal. The upconverting and downconverting may filter undesired channels from the output signal.

23 Claims, 3 Drawing Sheets

TRIPLE CONVERSION RF TUNER WITH SYNCHRONOUS LOCAL OSCILLATORS

CROSS REFERENCE TO RELATED APPLICATIONS

The present application may relate to co-pending application Ser. No. 09880290 filed concurrently, which is each hereby incorporated by reference in its entirety.

FIELD OF THE INVENTION

The present invention relates to a method and/or architecture for a radio frequency (RF) tuner generally and, more particularly, to a television tuner architecture that is amenable to higher integration and lower cost while maintaining excellent performance for both cable and broadcast systems.

BACKGROUND OF THE INVENTION

Referring to FIG. 1, a current single conversion tuner module 10 is shown. Single conversion refers to the number of frequency translations that the incoming signal is subjected. For example, in the U.S. the frequency plan for most cable networks span the frequencies from 54 MHz to 857 MHz. Each channel at the input of the tuner 10 spans 6 MHz for a total of 133 input channels. The tuner 10 selects one out of the multitude of channels and translates the selected channel to a fixed IF frequency of 44 MHz. Frequency translation is also commonly termed as conversion, hence the tuner 10 is often referred to as a single conversion system. The single conversion is achieved by mixing the incoming signals with a local oscillator signal (OSC) present inside the tuner 10. For example, if an incoming channel centered at 100 MHz is mixed with a 144 MHz local oscillator signal, the resultant signal at the output of the mixer 14 is a sum frequency product at 244 MHz and a difference frequency product at 44 MHz. The sum frequency product is typically eliminated by use of a SAW filter 16, centered at the desired output or Intermediate Frequency (IF), in this case at 44 MHz. SAW filters provide a high degree of selectivity to the incoming signals providing a significant level of attenuation to signals outside of the pass band. In the U.S., the SAW filter pass band is selected to be approximately one channel bandwidth (i.e., 6 MHz).

If in the above illustration, the channel at 100 MHz is defined as the desired channel, there also exists an image or undesired channel which could also mix with the local oscillator signal OSC and produce an output at the IF of 44 MHz. Consider an example of a channel at 188 MHz. If the channel were to be mixed with a local oscillator signal at 144 MHz, the channel could also produce a difference output at the IF of 44 MHz and a sum frequency output product at 188 MHz. The SAW filter 16 would attenuate the output at 188 MHz. However, the SAW filter 16 would not be able to distinguish between the output of the image channel mixing and the output of the desired channel mixing, both of which would be at the desired IF of 44 MHz. The single conversion tuner 10 overcomes an undesired channel by the use of the tracking channel filter 12 at the input of the tuner 10. The incoming signals pass through the tracking filter 12 before the mixer 14. Tracking filters are typically 20–40 MHz wide and eliminate the undesired image channel from being subjected to the mixing process, thereby ensuring that the output at the IF is only due to that of the desired channel.

For a given mixing step, there exists an undesired image channel spaced at twice the IF from the desired channel. While the use of input tracking filters greatly alleviates the image channel problem, input filters need to track the local oscillator frequency in order to ensure that the image rejection is maintained across the input signal band. Moreover, in cable modem systems, for proper operation each modem also needs to present a controlled input impedance across the input frequency band. The input tracking filters present a non-uniform input impedance across the input frequency range while attenuating the image channel. Typically, input tacking filters have tuned passive devices, which need to be manually tuned during the tuner module assembly process. Manual tuning is a significant portion of the manufacturing costs. To overcome the single conversion tuner drawbacks, tuner manufacturers have introduced tuner modules, which feature a dual conversion architecture.

Referring to FIG. 2, a typical dual conversion tuner module 20 is shown. In dual conversion tuners the frequency translation from the input frequency band of 48 MHz–857 MHz to the output IF of 44 MHz is achieved in two mixing steps. Nominally the first mixing step 24 involves upconverting the entire input frequency band to a first IF frequency (IF1) which is 1100 MHz. There are two desirable properties associated with this upconversion mixing. The first IF at 1100 MHz is out of band to the input channel frequency band. Also, the image channel for the first IF needs to be filtered out with a fixed low pass filter 22 at the input of the tuner 20. The low pass filter 22 would not have to be a tracking filter and could help present a controlled impedance to a cable network. If for example, the desired channel is located at 100 MHz, the first local oscillator signal frequency (OSCL) would have to be 1200 MHz for a subtractive upcoversion mixing step for a first IF of 1100 MHz. Since the tuner module 20 still has to have an output at 44 MHz, the second mixing step 28 downcoverts the signal at the first IF by mixing it with a second local oscillator signal (OSC2) at a frequency of 1056 MHz.

As in the single conversion tuner 10, there exists a SAW filter 30, which provides the desired channel selectivity at 44 MHz. However, the dual conversion tuner architecture has the following drawback. The image channel for the second mixing step 28 could still be present at the first IF output IF1. For example, in the above illustration if there is a signal present at the first IF IF1 at 1012 MHz, the signal too would downconvert and appear at the second IF output IF2 at 44 MHz. The SAW filter 30 would not be able to distinguish such a signal from the desired channel. Therefore, the filter 26 at the first IF of 1100 MHz should have a narrow pass band or a high enough Q (quality factor) to suppress the signal at the image frequency of the second mixing process. Typically the Q would have to be about 50 to ensure sufficient attenuation of the image. Such a narrowband filter at high frequencies such as 1100 MHz are expensive and often necessitate the use of a matching network to properly interface to both the output of the first mixer 24 and to the input of the second mixer 28.

Since the dual conversion architecture 20 employs two mixing steps, there could be additional distortion and phase noise compared to the single conversion tuner architecture 10. Each mixing step could introduce distortion due to the mixing process. The phase noise present in the local oscillator signal(s) could also degrade the signal integrity.

SUMMARY OF THE INVENTION

The present invention concerns an apparatus comprising a first circuit, a second circuit and a third circuit. The first circuit may be configured to generate an upconverted signal in response to an input signal and a first oscillation signal. The second circuit may be configured to generate a downconverted signal in response to the upconverted signal and as second oscillation signal. The third circuit may be configured to generate an output signal in response to the downconverted signal and a third oscillation signal derived from the second oscillation signal. The upconverting and downconverting may filter undesired channels from the output signal.

The objects, features and advantages of the present invention include providing a method and/or architecture for a RF tuner that may (i) provide selectivity and gain while not degrading the quality of the incoming signal by adding unwanted noise or distortion, (ii) implement a tuner with higher levels of integration, thereby reducing the number of passive components required, and reduce tuner form factor, and/or (iii) eliminate the need for manually tuned components providing increased reliability of operation.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
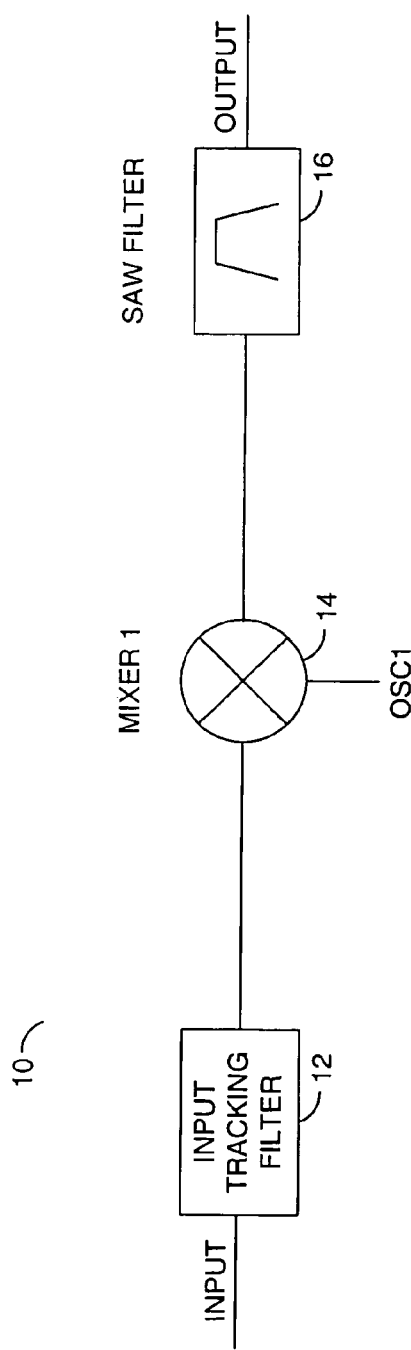
FIG. 1 is a block diagram of a conventional single conversion tuner circuit.
Figure 2:
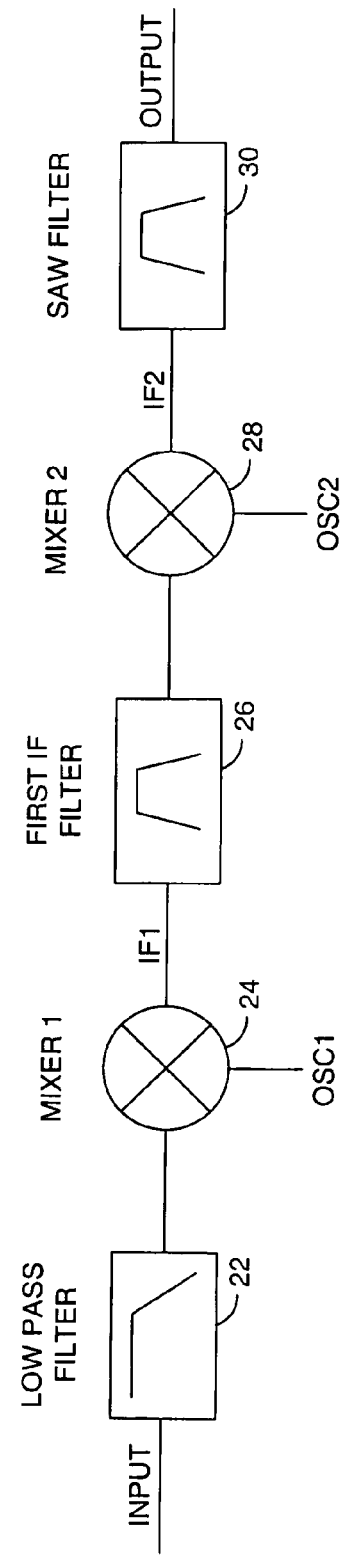
FIG. 2 is a block diagram of a conventional dual conversion tuner circuit.
Figure 3:
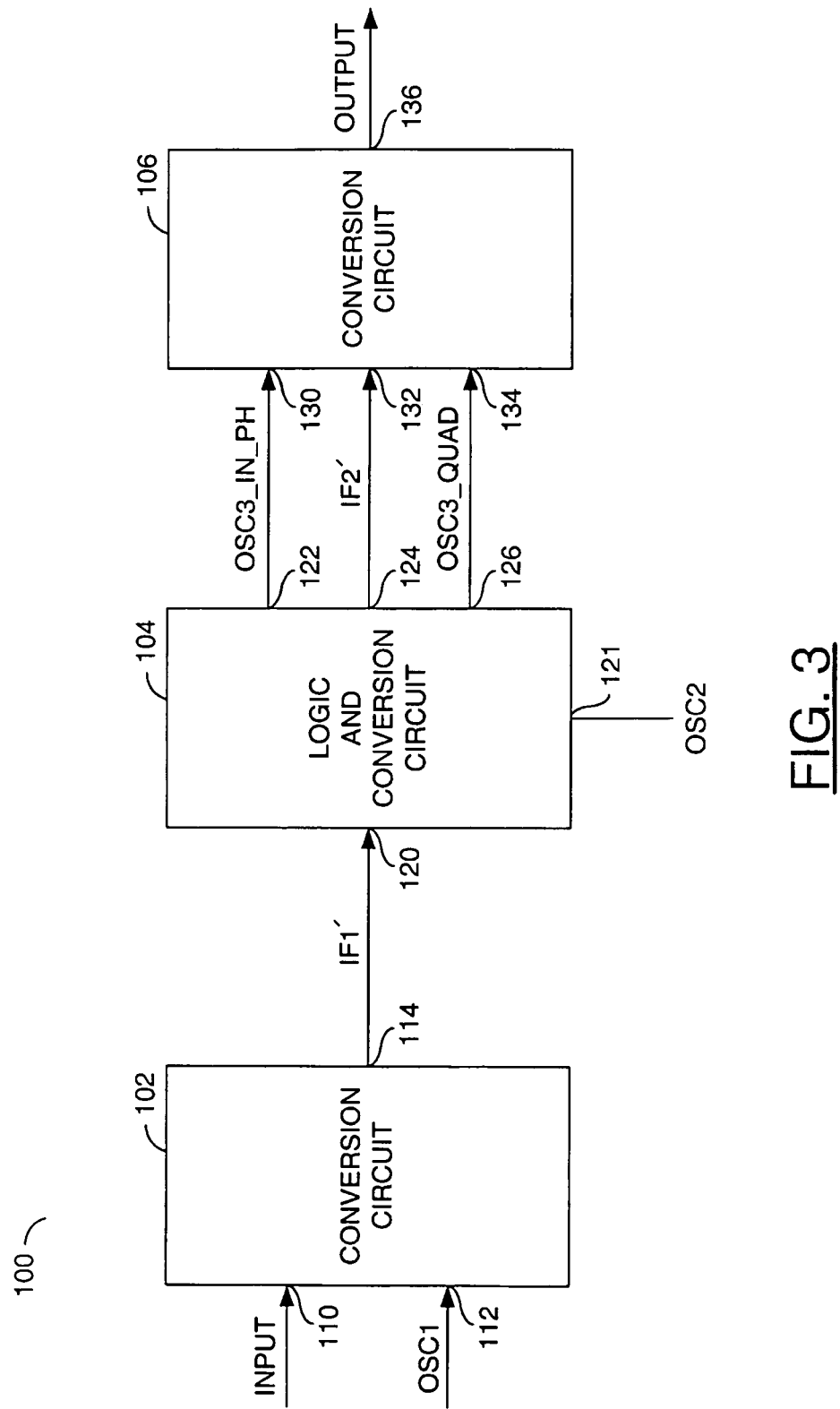
FIG. 3 is a block diagram of a preferred embodiment of the present invention.

Referring to FIG. 3, a block diagram of a circuit 100 is shown in accordance with a preferred embodiment of the present invention. The circuit 100 may be implemented as a triple conversion RF tuner with synchronous local oscillators. The present invention may provide a tuner with higher levels of integration, thereby reducing the number of passive components required. The present invention may also reduce tuner form factor. In addition, the present invention may eliminate the need for manually tuned components providing increased reliability of operation.

The circuit 100 generally comprises a circuit 102, a circuit 104 and a circuit 106. The circuits 102 and 106 may be conversion circuits. The circuit 104 may be a logic and conversion circuit. The circuit 102 may have an input 110 that may receive input signal (e.g., INPUT), an input 112 that may receive a clock signal (e.g., OSC1) and an output 114 that may present a signal (e.g., IF1'). The signal INPUT may be an input frequency band. The circuit 104 may have an input 120 that may receive the signal IF1' an input 121 that may receive a signal (e.g., OSC2), an output 122 that may present a signal (e.g., OSC3_IN_PH), an output 124 that may present a signal (e.g., IF2') and an output 126 that may present a signal (e.g., OSC3_QUAD). The circuit 106 may have an input 130 that may receive the signal OSC3_IN_PH, an input 132 that may receive the signal RF2', an input 134 that may receive the signal OSC3_QUAD, and an output 136 that may present an output signal (e.g., OUTPUT). Each of the oscillator signals OSC1, OSC2, and OSC3 may be implemented as a periodic wave signal (e.g., sinusoidal, square, triangle, etc.).

Figure 4:
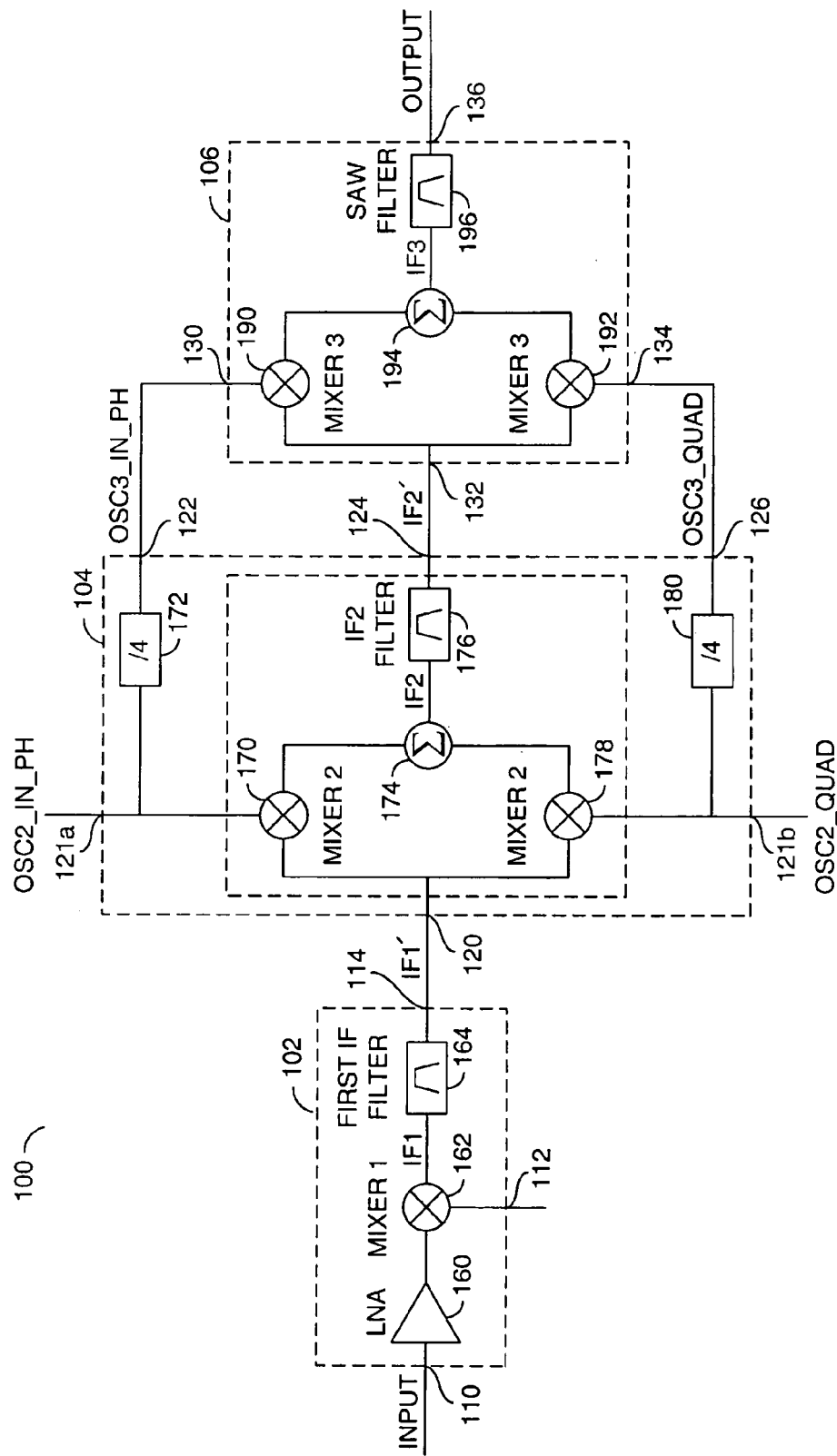
FIG. 4 is a detailed block diagram of the circuit of FIG. 3.

Referring to FIG. 4, a more detailed diagram of the circuit 100 is shown. The circuit 102 is shown comprising a circuit 160, a circuit 162 and a circuit 164. The circuit 160 may be implemented as a low noise amplifier (LNA) circuit. The circuit 162 may be implemented as a mixer circuit. The circuit 164 may be implemented as an intermediate filter circuit.

The circuit 104 may have an input 121a that may receive an in-phase portion of the signal OSC2 (e.g., OSC2_IN—PH) and an input 121b that may receive a quadrature portion of the signal OSC2 (e.g., OSC2_QUAD). The circuit 104 generally comprises a circuit 170, a circuit 172, a circuit 174, a circuit 176, a circuit 178 and a circuit 180. The circuit 170 may be implemented as a mixer circuit. The circuit 172 may be implemented as a divider circuit. The circuit 174 may be implemented as a summation circuit. The circuit 176 may be implemented as an intermediate filter circuit. The circuit 178 may be implemented as a mixer circuit. The circuit 180 may be implemented as a divider circuit.

The circuit 106 generally comprises a circuit 190, a circuit 192, a circuit 194 and a circuit 196. The circuit 190 may be implemented as a mixer circuit. The circuit 192 may be implemented as a mixer circuit. The circuit 194 may be implemented as a summation circuit. The circuit 196 may be implemented as an implementation filter circuit. In one example, the circuit 196 may be implemented as a SAW filter.

The input frequency band signal INPUT may be passed through the variable gain low noise amplifier 160. The amplifier 160 may condition the amplitude of signal INPUT such that the strength of the signal INPUT presented to the mixer 162 is relatively constant even with varying amplitudes of the signal INPUT. The mixer 162 may upconvert the entire input signal band to a first IF of 1324 MHz. A first local oscillator frequency (e.g., OSC1) may be variable over a frequency of 1378 MHz–2324 MHz. For example, if the desired channel is at 100 MHz, the chosen first frequency OSC1 may be 1424 MHz which generally implies that the image channel for the mixer 162 may be located at 2748 MHz (which is out of band to the channel frequencies present on a cable network). After the filter 164 operation, the mixers 170 and 178 may downconvert the input signal to the second IF (filter 176) at 300 MHz.

A local oscillator clock (e.g., OSC2_IW_PH) to the mixers 170 and 178 may be at 1024 MHz, which implies that the image channel for the mixers 170 and 178 may be located at 724 MHz. The filter 164 may eliminate or substantially attenuate signal content at 724 MHz, which is possible to achieve with a filter Q of about 20. Such a filter considerably reduces the performance needed for implementing the filter 164 when compared to the filter in the dual conversion tuner architecture 20 of the background section. In addition, a filter with Q of around 20 could be achieved by low cost passive components and also lends to being integrated onto the same integrated circuit as the mixer 162.

To further improve the image rejection capability, the mixers 170 and 178 may be implemented as an image reject type filter. The input signal may be mixed in two separate signal paths, with the local oscillator clocks OSC2_IW_PH and OSC2_QUAD phased in quadrature relationship in the two paths. A quadrature relationship may allow the signals OSC2_IW_PH and OSC2_QUAD to be phased 90 degree apart in the two signal paths. After the quadrature mixing process (e.g., the mixers 170 and 178), each of the two signal paths may be combined at the summation circuit 174 and filtered at the filter 176 to form the signal IF2'. A more detailed explanation can be found in application Ser. No.

09/880,290, filed Jun. 13, 2001, now abandoned. The mixers 190 and 192 may then downcovert the IF2' signal to 44 MHz, by mixing with the third local oscillator signals OSC3_IW_PH and OSC3_QUAD located at a frequency of 256 MHz.

The mixers 190 and 192 may also be implemented as an image reject type mixers that may attenuate the image signals for the mixing step 190 and 192, which may be located at 212 MHz. Hence, the requirement on the filter 176 may be to provide attenuation of signal energy present at 212 MHz which is possible with a filter Q of around 20. Similar to the filter 164, the filter 176 may also be implemented with low-cost passive components or integrated onto the same integrated circuit as the mixers 170 and 178. The quadrature outputs of the third mixing step 190 and 192 may be combined at the summation circuit 194 and then filtered by the SAW filter 196 at 44 MHz to provide the desired channel selectivity. The triple conversion architecture 100 may provide high performance and high Q filter.

To help ensure that the additional mixing step in the present architecture does not degrade the signal integrity by introducing additional phase noise due to the third signal OSC3, the architecture generally exploits the frequency relationship between OSC2 and OSC3 (e.g., OSC2 may be 4 times the frequency of OSC3). Such division may be achieved by dividing the frequency of OSC2 by four, since a synchronous frequency division process may improve the signal phase noise by 20 log(4), or about 12 dB. The synchronous division process 172 and 180 may ensure that the phase noise of OSC3 is 12 dB lower than that of OSC2. The circuit 100 does not generally degrade the tuner signal integrity by the addition of the third mixing step 190 and 192.

The circuit 100 may be implemented as a triple conversion tuner circuit that may overcome the drawbacks of the conventional dual conversion circuit and may be enabled either as a low cost, small form factor solution or alternatively integrated onto an Integrated Circuit (IC). The circuit 100 may also be implemented without introducing additional phase noise into the tuner signal path when compared to a conventional dual conversion architecture.

The present invention may be applicable in tuners for cable modems, analog TVs, PC-TVs, set-top boxes or in tuners for TV signal reception. In one example, the circuit 100 may be implemented as a single microcircuit (or microchip) integrating all the active elements such as the LNA, the mixers, the combiners, the local oscillator generating circuits and any additional signal amplification circuits or distributed onto separate integrated circuits. However, the circuit 100 may be implemented on a plurality of microcircuits (or microchips) as needed to meet the design criteria of a particular implementation.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a first circuit comprising a first filter and a first mixer configured to generate an upconverted signal in response to mixing an input signal and a first oscillation signal, wherein said first filter is implemented at a quality factor which allows (i) said first filter to filter undesired channels from said unconverted signal and (ii) said first mixer to be integrated on the same integrated circuit as said first filter;
    a second circuit comprising a second filter and a second mixer configured to generate a downconverted signal in response to mixing said upconverted signal and a second oscillation signal, wherein said second filter is implemented at a quality factor which allows (i) said second filter to filter undesired channels from said downconverted signal and (ii) said second mixer to be integrated on the same integrated circuit as said second filter; and
    a third circuit configured to generate an output signal in response to mixing said downconverted signal with a third oscillation signal, wherein (i) said third oscillation signal is generated by dividing said second oscillation signal in said second circuit and (ii) said third circuit is configured to filter undesired channels from said output signal.

2. The apparatus according to claim 1, wherein (i) said first circuit comprises a low noise amplifier configured to receive said input signal, (ii) said first mixer is coupled to an output of said low noise amplifier and (iii) said first filter is coupled to an output of said first mixer and configured to generate said upconverted signal.

3. The apparatus according to claim 2, wherein said first filter comprises an intermediate frequency filter and is further configured to receive said first oscillation signal.

4. The apparatus according to claim 1, wherein:
    said second circuit further comprises a first summation circuit configured to receive one or more outputs of said second mixer; and
    said second filter is configured to receive an output of said summation circuit and generate said downconverted signal.

5. The apparatus according to claim 4, wherein said second mixer is configured to receive an in phase signal of said second oscillation signal and a quadrature phase signal of said second oscillation signal, wherein said second filter comprises an intermediate frequency filter.

6. The apparatus according to claim 1, wherein said third circuit comprises:
    a third mixer configured to receive said downconverted signal;
    a second summation circuit configured to receive one of the outputs of said third mixer; and
    a third filter configured to (i) receive an output of said summation circuit and (ii) generate said output signal.

7. The apparatus according to claim 6, wherein said third mixer is configured to receive an in phase signal of said third oscillation signal and a quadrature signal of said third oscillation signal, wherein said third filter comprises a SAW filter.

8. The apparatus according to claim 1, wherein said apparatus is further configured to provide selectivity and gain while not degrading a quality of the input signal.

9. The apparatus according to claim 1, wherein said apparatus is configured to reduce unwanted noise or distortion.

10. The apparatus according to claim 1, wherein said apparatus comprises a single microchip architecture.

11. The apparatus according to claim 1, wherein said apparatus is implemented on a plurality of microchips.

12. The apparatus according to claim 1, wherein said apparatus comprises a tuner.

13. The apparatus according to claim 6, wherein said third mixer comprises an image reject type mixer.

14. An apparatus comprising:
    means for generating an upconverted signal with a first filter and a first mixer in response to an input signal and a first oscillation signal, wherein said first filter is implemented at a quality factor which allows (i) said first filter to filter undesired channels from said unconverted signal and (ii) said first mixer to be integrated on the same integrated circuit with said first filter;

means for generating a downconverted signal with a second filter and a second mixer in response to mixing said upconverted signal and a second oscillation signal, wherein said second filter is implemented at a quality factor which allows (i) said second filter to filter undesired channels from said downconverted signal and (ii) said second mixer to be integrated on the same integrated circuit with said second filter; and means for generating an output signal in response to mixing said downconverted signal with a third oscillation signal, wherein (i) said third oscillation signal is generated by dividing said second oscillation signal in said means for generating said downconverted signal and (ii) said means for generating said output signal is configured to filter undesired channels from said output signal.

15. A method for filtering undesired channels from an output signal, comprising the steps of:

(A) generating a upconverted signal with a first filter and a first mixer in response to an input signal and a first oscillation signal, wherein said first filter is implemented at a quality factor which allows (i) said first filter to filter undesired channels from said unconverted signal and (ii) said first mixer to be integrated on the same integrated circuit as said first filter;

(B) generating a downconverted signal with a second filter and a second mixer in response to an upconverted signal and a second oscillation signal, wherein said second filter is implemented at a quality factor which allows (i) said second filter to filter undesired channels from said downconverted signal and (ii) said second mixer to be integrated on the same integrated circuit as said second filter; and (C) generating said output signal in response to said downconverted signal with a third oscillation signal wherein said third oscillation signal is generated by dividing said second oscillation signal.

16. The method according to claim 15, wherein step (A) comprises:

receiving said input signal by a low noise amplifier;

coupling said first mixer to an output of said low noise amplifier; and coupling said first filter to an output of said first mixer to generate said upconverted signal.

17. The method according to claim 16, wherein said first filter comprises an intermediate frequency filter and said first mixer is further configured to receive said first oscillation signal.

18. The method according to claim 15, wherein step (B) comprises:

receiving said upconverted signal by said second mixer;

configuring a first summation circuit to receive one or more outputs of said second mixer; and configuring a second filter to receive an output of said summation circuit to generate said downconverted signal.

19. The method according to claim 15, wherein step (C) comprises:

configuring a third mixer to receive said downconverted signal;

configuring a second summation circuit to receive one outputs of said third mixer; and configuring a third filter to receive an output of said summation circuit to generate said output signal.

20. The method according to claim 18, wherein said second mixer is configured to receive an in phase signal of said second oscillation signal and a quadrature phase signal of said second oscillation signal.

21. The method according to claim 15, wherein said method is implemented on a single microchip architecture.

22. The method according to claim 15, wherein said method is implemented on a plurality of microchips.

23. The method according to claim 19, wherein said third mixer is configured to receive an in phase signal of said third oscillation signal and a quadrature phase signal of said third oscillation signal in quadrature phase.

* * * * *